Figure 1:
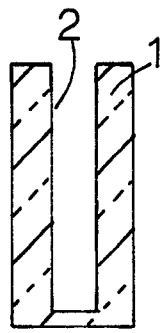

United States Patent [19]

Neefe

[11] Patent Number: 4,460,523

[45] Date of Patent: Jul. 17, 1984

[54] METHOD OF MAKING COSMETIC CONTACT LENSES

[76] Inventor: Charles W. Neefe, 2701 Rebecca St., Big Spring, Tex. 79720

[21] Appl. No.: 463,541

[22] Filed: Mar. 14, 1983

Related U.S. Application Data

[63] Continuation-in-part of Ser. No. 462,413, Jan. 31, 1983.

[51] Int. Cl.³ .............................................. B29D 11/00
[52] U.S. Cl. ...................................... 264/1.9; 264/1.1; 264/1.7; 351/162; 351/177
[58] Field of Search ................. 264/1.1, 1.7, 1.8, 1.9; 8/507; 351/162; 523/106

[56] References Cited

U.S. PATENT DOCUMENTS

| | | | |
|---|---|---|---|
| 2,391,305 | 12/1945 | Galeski | 351/162 |
| 3,034,403 | 5/1962 | Neefe | 351/162 |
| 3,171,869 | 3/1965 | Weinberg | 351/162 |
| 3,454,332 | 7/1969 | Siegel | 264/1.8 |
| 3,712,718 | 1/1973 | LeGrand | 351/162 |
| 3,786,812 | 1/1974 | Neefe | 351/162 |
| 3,941,858 | 3/1976 | Shepherd | 264/1.7 |
| 4,121,885 | 10/1978 | Erickson et al. | 264/1.7 |
| 4,252,421 | 2/1981 | Foley, Jr. | 351/162 |

OTHER PUBLICATIONS

"Evaluation of 'Bacteriostatic' Contact Lenses," Chalkley et al., Am. J. Ophthalmology, vol. 61, No. 5, pp. 866-869, May 1966.

Primary Examiner—James B. Lowe

[57] ABSTRACT

A method of making cosmetic contact lenses which alter the apparent color of the iris by employing small light reflecting particles imbedded in a colored transparent matrix.

Cosmetic contact lenses as described herein are of a dual purpose to correct the visual errors and change the apparent color of the eye. The material iris pattern is visible through the lens providing a natural appearance.

5 Claims, 6 Drawing Figures

METHOD OF MAKING COSMETIC CONTACT LENSES

This is a continuation-in-part of application Ser. No. 06/462413 submitted Jan. 31, 1983, entitled: METHOD OF MAKING HYDROGEL COSMETIC CONTACT LENSES.

PRIOR ART

Several lens types have been produced in an effort to achieve this.

One attempt employed a laminated structure with a painted opaqu replica of the iris sandwiched between a clear and usually one opaque plastic member. The result is a thick heavy lens which was difficult to fabricate and difficult to wear. A later attempt employed a colored opaque porous member surrounding a clear cylinder from which the lens was cut by lathing. This resulted in a lens having a pupil and iris pattern and the porous member has the tendencies to flake and chip at the edge. (U.S. Pat. No. 3,454,332—Siegel) A third generation of colored lenses provided a thin layer of colored opaque markings placed in a clear material. The opaque colored marking radiated from the center of the clear material in a geometric pattern.

The present invention has the following advantages over the previous lenses: The entire lens area is transparent providing peripheral vision and allowing the natural iris pattern to be visible through the lens.

It is commonly known that any transparent conventional colored contact lens placed on a dark colored iris has little or no effect toward changing the apparent color of the eye. We have discovered that if a small amount of a light reflecting finely divided particle such as finely grounded oyster shell or mica is placed in a matrix of transparent colored lens material of a substantially lower refractive index, the reflected light will have the color of the lower refractive index media. We have also discovered that if a colored transparent central pupil area is provided, the lens will have a natural appearance when in place on the eye and bathed in the tears. As the light entering the transparent colored pupil area will enter the eye and be absorbed and give a dark natural appearance to the pupil area. Peripheral vision is also undisturbed. The peripheral semi-transparent area transmits from 50 to 90 percent of the light as compared to the transparent colored central pupil area, therefore, 10 to 50 percent of the available light is reflected by the imbedded particles and the reflected light has the color of the transparent matrix surrounding the reflecting particles. The macular area is reponsible for the high performance visual acuity; however, the peripheral area of the retina is more sensitive to lower levels of illumination. Therefore, any loss of lighting in the peripheral area is not apparent to the wearer provided the transparent pupil area and semitransparent peripheral area are the same color. A clear pupil surrounded by a blue periphery will produce a blue color in the peripheral visual fields. This is due to color comparison between central and peripheral fields. This has been a problem with earlier attempts to make cosmetic contact lenses and is overcome by adding transparent color to the pupil area.

Figure 2:
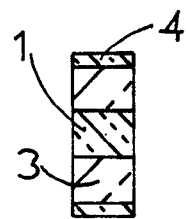
Figure 3:
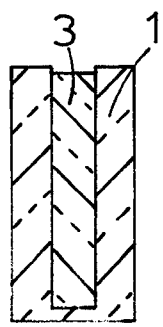
Figure 4:
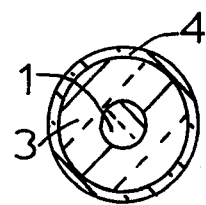
Figure 5:
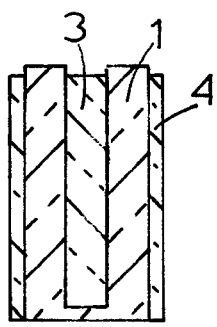
Figure 6:
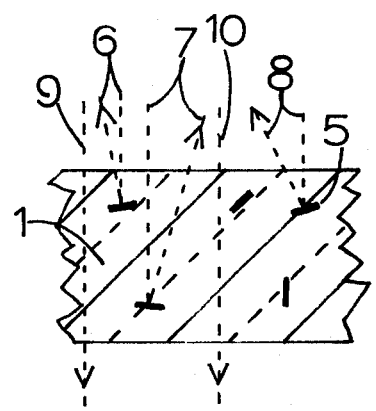

IN THE DRAWINGS:

FIG. 1 shows the open top cylinder in section.
FIG. 2 shows the lens blank from the side in section.
FIG. 3 shows the open top cylinder filled with colored transparent material in section.
FIG. 4 shows the blank from the front in section.
FIG. 5 shows the cylinder in section.
FIG. 6 shows the light reflecting particles imbedded in the transparent colored matrix.

THE LENSES ARE MADE AS FOLLOWS:

Hydrophilic, gas permeable or conventional hard lenses may be made by the following method:

The selected monomeric material, such as hydroxyethylmethacrylate and a suitable catalyst, such as benzoyl peroxide, to achieve polymerization are used. Pigments or a dye of the selected color, such as F.D. and C green Number 6, and the preselected amount of the reflecting particles are added to the monomer before polymerization and cast in the form of an open top cylindrical 1 FIG. 1 having an inner hole 2 FIG. 1 the diameter of the intended pupil in the lens.

A mixture of the selected monomer and colorant 3 FIG. 3 to which a suitable catalyst has been added is placed in the cylinder 1 FIG. 3 and allowed to polymerize. A third, clear casting 4 FIG. 5 is made from the selected monomer to which the suitable catalyst has been added and allowed to polymerize around the cylinder 1 FIG. 5. The cylinder is cut into discs having a transparent colored center 1 FIG. 2, a side view in section, 1 FIG. 4, a front view in section and surrounded by a colored segment having light reflecting particles imbedded in a colored transparent matrix 3 FIG. 2 and FIG. 4. The peripheral segment 4 FIGS. 2 and 4 is composed of clear transparent material. Contact lenses are cut from these discs by methods well known to the art.

The light reflecting particles 5 FIG. 6 are imbedded in a transparent colored polymer 1 FIG. 6. Light rays 9 and 10 FIG. 6 not reaching one of the reflecting particles passes through the lens as colored light. The light rays 6, 7 and 8 FIG. 6 imperging on the surface of the reflecting particles is reflected back as colored light. The eye takes on the apparent color of the reflected light. These lenses may be used as cosmetics for adding color to the eye for special events or for wear with special clothing, therefore, they may not be worn every day. This fact brings out the problem of sanitation in storage and use. To overcome this problem, antimicrobial agents must be used either in the storage solutions or in the lens itself.

Antimircrobial agents may be added to the monomer before polymerization and locked into the polymeric structure of the lens. These agents prevent the growth of micro-organisms on the lens surface and eliminate the need for disinfecting. Examples of useful antimicrobial agents are: 3-(trimethoxysilyl) propylocta decyldimethyl ammonium chloride, known as Dow Corning 5700, hexachlorophene, alkyl dimethyl benzoyl ammonium chlorides and Ethylmercurithiosalicylic Acid Sodium Salt.

Various modifications, of course, can be made without departing from the spirit of this invention or the scope of the appended claims. It is understood that many variations are obtainable which will yield materials disclosed herein. The constants set forth in this disclosure are given as examples and are in no way final or binding.

I claim:

1. A method of making a cosmetic contact lens blank by the steps of forming an open ended cylinder having an inside diameter equal to the size of the desired lens pupil and an outside diameter equal to the size of the desired lens iris, the cylinder being made from a selected transparent monomer, a transparent colorant and reflecting particles, the mixture is allowed to polymerize in a mold to form the cylinder, the cylinder is filled with a mixture of the transparent monomer and the said transparent colorant and allowed to polymerize, a larger cylinder of transparent monomer is cast around the first cylinder and allowed to polymerize, the cylinder is cut into discs.

2. A method as in claim 1 wherein the selected monomer is hydroxyethyl methacrylate.

3. A method as in claim 1 wherein the colorant is F D and C Green Number 6.

4. A method as in claim 1 wherein the light reflecting particles are finely ground oyster shells.

5. A method as in claim 1 wherein anitmicrobial agents are added to the monomer before polymerization.

* * * * *